United States Patent [19]
Wegner

[11] Patent Number: 5,290,596
[45] Date of Patent: Mar. 1, 1994

[54] METHOD OF MAKING COMPOSITE LAMINATE FOR SLIDING ELEMENS

[75] Inventor: Karl H. Wegner, Bad Schwalbach, Fed. Rep. of Germany

[73] Assignee: Glyco-Metall-Werke Glyco B.V. & Co, KG, Wiesbaden, Fed. Rep. of Germany

[21] Appl. No.: 66,616

[22] Filed: May 25, 1993

Related U.S. Application Data

[60] Continuation of Ser. No. 912,088, Jul. 9, 1992, abandoned, which is a division of Ser. No. 622,236, Dec. 3, 1990, Pat. No. 5,171,622.

[30] Foreign Application Priority Data

Dec. 1, 1989 [DE] Fed. Rep. of Germany ....... 3939704

[51] Int. Cl.$^5$ .............................................. B05D 5/08
[52] U.S. Cl. .................................................... 427/287
[58] Field of Search ............... 252/12, 12.2, 29, 30; 427/287

[56] References Cited

U.S. PATENT DOCUMENTS

| | | | |
|---|---|---|---|
| 2,600,321 | 6/1952 | Pyle | 260/38 |
| 3,224,966 | 12/1965 | Li | 252/12.2 |
| 3,314,885 | 4/1967 | Murphy, Jr. | 252/25 |
| 3,776,845 | 12/1973 | Watanabe et al. | 252/12 |
| 3,788,987 | 1/1974 | Bartlett | 252/25 |
| 3,908,038 | 9/1975 | Nienart et al. | 252/12.2 |
| 4,303,537 | 12/1981 | Laepple et al. | 252/30 |
| 4,582,368 | 4/1986 | Fujita et al. | 308/5 R |

FOREIGN PATENT DOCUMENTS

| | | |
|---|---|---|
| 2023708 | 11/1970 | Fed. Rep. of Germany . |
| 2307034 | 11/1976 | France . |
| 57-102949 | 6/1982 | Japan . |
| 59-155620 | 9/1984 | Japan . |
| 59-227924 | 12/1984 | Japan . |
| 61-185753 | 8/1986 | Japan . |
| 62-185748 | 8/1987 | Japan . |
| 63-086764 | 4/1988 | Japan . |
| 2232672 | 12/1990 | United Kingdom . |

Primary Examiner—Terry J. Owens
Assistant Examiner—Erma Cameron
Attorney, Agent, or Firm—Herbert Dubno

[57] ABSTRACT

A lacquer coating is applied to a laminated metal composite forming a sliding element such as a plane bearing and has particles of solid lubricants incorporated therein to form islets of greater thicknesses than the surrounding film and which serve as lubricant trapping surface formations.

4 Claims, 2 Drawing Sheets

METHOD OF MAKING COMPOSITE LAMINATE FOR SLIDING ELEMENS

This is a continuation of co-pending application Ser. No. 07/912,088 filed on Jul. 9, 1992, now abandoned, which is a division of Ser. No. 07/622,236 filed Dec. 3, 1990, now U.S. Pat. No. 5,171,622.

FIELD OF THE INVENTION

My present invention relates to a composite laminate for sliding elements. More particularly, the invention relates to a two-layer or three-layer composite having a metallic sliding layer, generally of an aluminum alloy, and a conforming layer on a free surface thereof engaging the surface which is to slide on the composite or upon which the composite is to slide.

BACKGROUND OF THE INVENTION

When I refer to "sliding elements" herein or use terminology of similar import, I intend thereby to describe a structure which is intended in machine applications and the like to slide upon another structure or upon which another structure is intended to slide. Typical of such sliding elements is a plain bearing or sleeve bearing which may receive a shaft or rod which is intended to rotate or reciprocate in that bearing with a sliding surface of the shift or rod in direct contact with the free surface of the sliding element. Similar principles are used in linear sliding structures. For example, the tailstock or longitudinal slide or cross slide of a lathe or other machine tool may slide longitudinally on guideways of a bed or other part of the machine tool. Either the body which slides or the stationary body, for example, the bed, may then be provided with a sliding element in accordance with the invention since there is a sliding engagement of a moving part with a stationary part in a linear direction in these systems. The sliding elements of the invention can, therefore, be used whereever two machine parts are to slide on one another and one of these parts is to have a low friction reduced-wear surface. Where reference is made herein to a conforming layer, or terms of a similar import are used, I intend thereby to describe a layer which has slight deformability when the parts are brought together and are in sliding contact to conform to the surface of the part riding on the sliding element or on which the sliding element rides and which also conforms to the surface of the sliding element to which that layer is applied.

From German Patent Document DE-OS 22 06 400 and German Patent Document DE-OS 27 07 041, composite structures for slide elements are described in which polymer compounds with friction reducing or sliding improving additives are applied to the sliding layer of the composite or as the sliding layer to form the composite. It is also known to apply solid lubricants for the direct formation of a lubricant film in the form of powder or pastes to such sliding elements.

However, these techniques can yield effective results only when the surfaces which are juxtaposed and are to slide relative to one another have been properly prepared by mechanical means, for example, brushing, sand blasting or other roughening techniques, to provide contours which trap the friction and wear reducing materials or the surfaces are provided with a sintered structure or otherwise formed with grooves, recesses or depressions to accommodate the lubricant materials. Such techniques are time consuming and expensive and are not always practical.

OBJECTS OF THE INVENTION

It is, therefore, the principal object of this invention to provide an improved composite for the purposes described so that the material between the sliding surfaces is more uniformly loaded, better distributed and retained in place more effectively whereby an overall improvement in the quality of the sliding element is obtained.

Another object of the invention is to provide a low cost sliding element or plane bearing structure which is free from the drawbacks of earlier systems.

Still another object of the invention is to provide an improved method of fabricating a slide element with advantages over prior art sliding elements, at substantially lower cost.

SUMMARY OF THE INVENTION

These objects and others which will become apparent hereinafter are attained, in accordance with the invention, in a two-layer or three-layer composite structure in which, for example, an aluminum alloy sliding layer is applied to a support layer, e.g. of steel, and a conforming layer is applied to the sliding layer. According to the invention, the conforming layer comprises a film-like thin coating of a sliding lacquer containing disposed therein a filler which improves the sliding characteristics and which has over the greater part of its area a basic thickness of at most 10 micrometers and having nonuniformly distributed local regions in a fleck-like or islet pattern of greater thickness, preferably containing the filler.

These regions of greater thickness, which may appear as dark flecks in a kind of leopard spot pattern in the otherwise thin layers of the lacquer, contain the solid friction reducing materials. The rises provide a synthetic surface roughness which, in tribological systems provides improved retention of lubricants, especially liquid lubricants.

With wear of the high points, the friction reducing solids constituting the fillers are liberated, thereby improving the sliding characteristics of the slide element with use.

Apart from the functional advantages afforded by the invention, therefore, there is also a significant reduction in the cost of making the slide element since the materials used are of low cost and it is possible to apply the conforming layer at low cost and without the need for expensive surface treatments of the metal surface.

In a preferred embodiment of the invention, the thin-film lacquer coating has a basic thickness between 2.5 micrometers and 6 micrometers, preferably between 3 micrometers and 5 micrometers, while the thickest (i.e. the islets of increased thickness) have a thickness of say 10 micrometers.

The solid fillers which improve the sliding characteristics can be provided as fine particles with thicknesses of up to 10 micrometers and preferably are trapped in the thickened regions of the slide lacquer coating.

The sliding lacquers can be composed of a soluble polymer, for example, an epoxy resin, and the filling can be constituted from pulverulent lubricants, for example, polytetrafluoroethylene and/or fluorinated graphite and/or molybdenum disulfide. The sliding lacquer coating is preferably bound into or baked onto the free surface of the sliding layer.

According to the method aspect of the invention, a two-layer or three-layer composite with a metallic sliding layer, e.g. of an aluminum alloy, has its free surface degreased but otherwise untreated, i.e. not treated by another roughening technique.

The degreased surface is provided with a film forming thin layer of a dispersion of the solids capable of improving the sliding properties in a polymer solutions so that fleck-like thickened areas are formed in the coating upon the drying, setting or cross linking of the polymer in the coating.

The so formed nonhomogeneous film is then heated to a temperature of 100° C. to 250° C. to bake the coating into the metal surface and thereby complete the thermosetting of the polymer, and encapsulate the solids in the film. The use of a dispersion of a polymer solution and the filler particles thus may allow a uniform thickness of the coating to be applied to the metal surface. As a result of solvent loss and increasing setting, however, the lacquer layer thickness reduces so that the fleck-like regions or rises emerge. By controlling the process, it is possible to determine the relative thicknesses of the base layer and the rises.

This effect is most reliably obtained and is most strongly observed when the attached coating thickness is substantially equal to or slightly greater than the maximum thickness of the particles dispersed in the dispersion and when solidification, and drying takes place immediately after coating of the dispersion onto the metal surface. It appears that this relationship results in a local contraction of the solid particles together in the fleck regions or rises and that this phenomenon occurs before the coating and the various regions thereof are fully anchored to the surface which is coated.

The thickness reduction of the lacquer matrix is preferably effected by carrying out a precrosslinking of the lacquer matrix by the application of an elevation temperature for a specific time interval immediately after coating.

The application of the sliding lacquer coating can be effected in a simple manner. For example, the lacquer can be sprayed onto the metal surface. It is also possible to utilize roller or blade doctoring techniques to apply the dispersion. The dispersion can be formed by mixing fine particles of polytetrafluoroethylene and/or fluorinated graphite and/or molybdenum disulfide to an epoxy resin in a solvent for evaporation at the temperature given.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION AND SPECIFIC EXAMPLE

Figure 1:
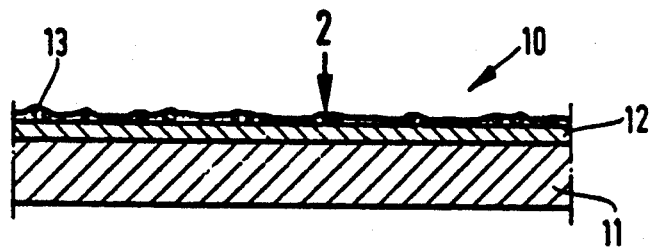
FIG. 1 is a cross sectional view through a composite sliding element, according to the invention, enlarged in scale.

FIG. 1 shows a laminated structure 10 forming a sliding element according to the invention which can be, for example, a connecting rod bearing for a diesel engine.

The laminated composite 10 comprises a support layer 11 of steel and a sliding layer 12 of an aluminum alloy of, for example, the type AlZn5Si2CuPb. This sliding layer 12 is formed on its upper surface with a conforming layer 13 which is described in greater detail below.

Figure 2:
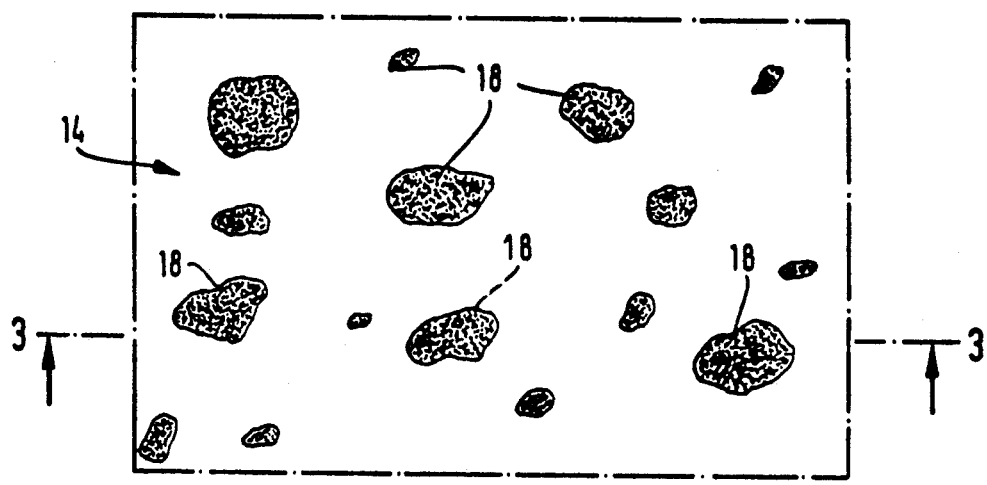
FIG. 2 is a view in the direction of arrow 2 of FIG. 1 to a still larger scale.
Figure 3:
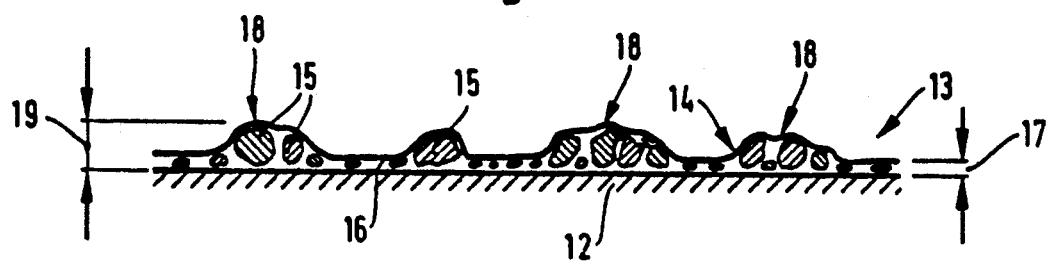
FIG. 3 is a section taken along the line 3—3 of FIG. 2.

As FIGS. 2 and 3 show, the conforming layer 13 is constituted of a film-like thin coating 14 of a sliding lacquer in which solid particles of a sliding-promoting substance 15 is received. The particles 15 are trapped in the lacquer matrix 16.

The greater part of the area of the coating 14 (see FIGS. 2 and 3) has a relatively small basic thickness 17 which can correspond to the thickness of the film without the solids. This basic thickness can be from 3 micrometers to 5 micrometers and can vary between them.

From this layer of basic thickness project in a fleck pattern, islets 18 which represent rises or elevated regions, which are nonuniformly distributed and are of nonuniform size; protrude outwardly. They can have, however, a greater thickness than the thickness 17 and have been represented as having the thickness 19 which may be about 10 micrometers.

As is apparent also from FIG. 3, the particles 15 can have a particle size or thickness of up to 10 micrometers themselves although they may have substantially lower particle sizes as is also apparent from FIG. 3 and can gather in the islets. The lacquer coating 14 is baked onto the free surface of the sliding layer 12. It can comprise, in the specific example, an epoxy resin containing up to 15% by weight of a mixture of equal parts of polytetrafluoroethylene, fluorinated graphite and molybdenum disulfide particles. The minimum particle size of these particles may be 5 micrometers and the maximum particle size about 10 micrometers as noted.

Figure 4:
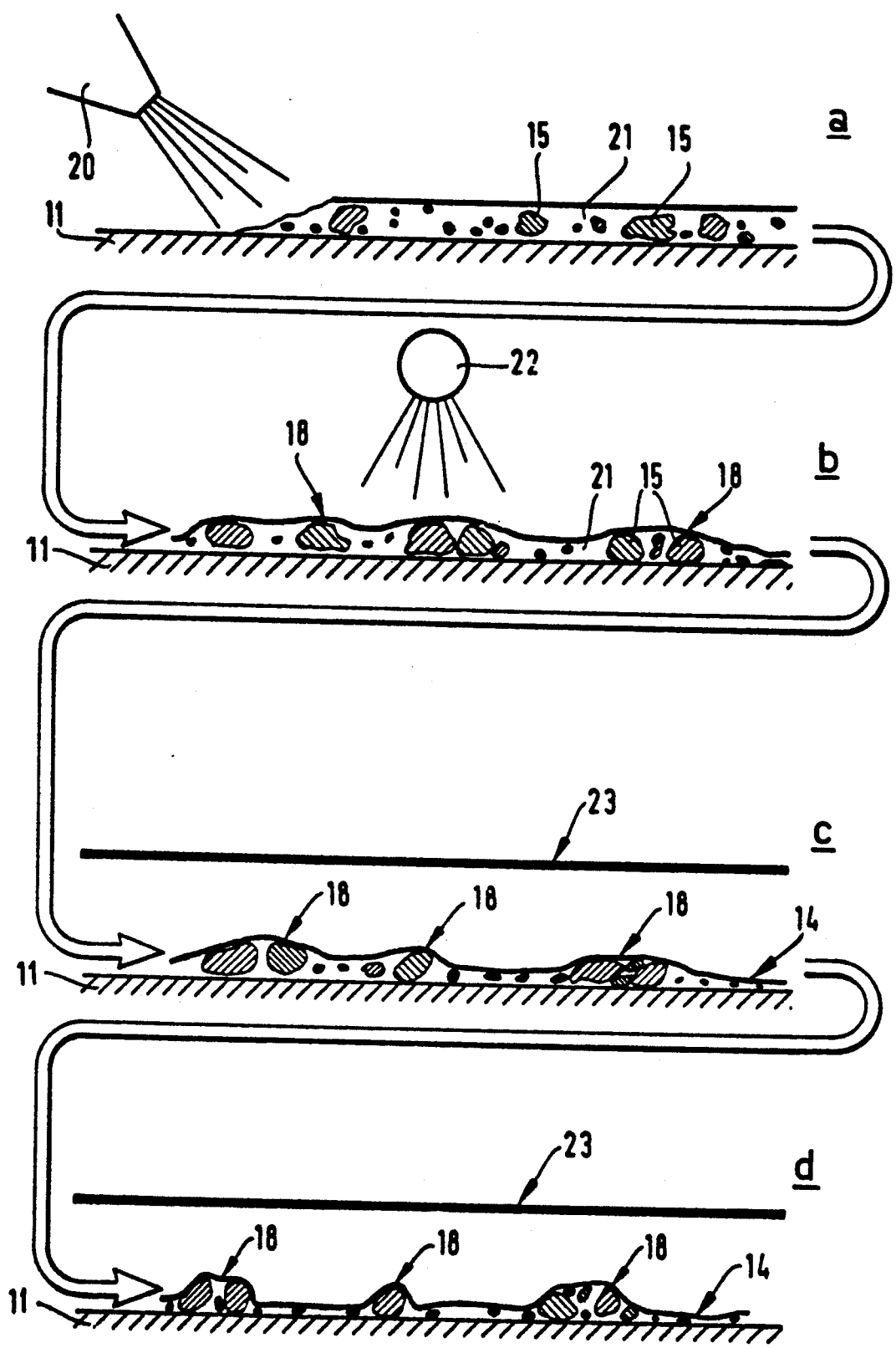
FIGS. 4a, 4b, 4c and 4d are diagrams illustrating the steps in the production of the composite element of FIGS. 1 and 3.

In FIG. 4 I have shown a preferred method of making the sliding element of FIGS. 1 to 3.

In step a of FIG. 4 I have shown a spray device 20 which is spraying a previously prepared dispersion of the dissolved polymer and solid particles onto the free surface of the sliding layer 12 of the laminated body 10. The thickness of the spray dispersion layer 21 is between 10 and 15 micrometers so that even the thickest particles 15 are fully immersed in the polymer solution. Because of the surface temperature of the polymer solution, namely, the epoxy resin, a substantially smooth surface is formed on the dispersion layer 21.

Directly following the spray of the dispersion layer 21 on the aluminum support layer 11, the dispersion layer is heated to 100° C. for a period of several minutes as represented by step b utilizing a radiant heater 22. There results a precrosslinking of the lacquer matrix which gives rise to a shrinkage of the latter and to a certain extent one can observe the islets being formed as the solid particles tend to come together and protrude above the remainder of the lacquer matrix.

The incipient islet rises are represented as 18 in step b of FIG. 4.

After this brief precrosslinking of the lacquer matrix, the composite can be stored for some time and, if desired, can be shaped by bending or other techniques to form bearing shells or bushings.

In steps c and d, baking of the lacquer layer 14 into the surface of the metal layer 11 is effected at a temperature of 100° C. to 250° C. in the tunnel oven 23. The baking and hardening step results in a further shrinkage of the lacquer matrix so that the islets 18 are now seen to be more prominent and to have the configuration shown in FIGS. 1 through 3.

Tests of the product, utilizing it as a radial bearing in a radial bearing test stand in which the effect is similar to that which applies when the bearing forms the connecting rod bearing in a diesel engine, were carried out. In all of the test examples, the sliding metal layer 11 was an aluminum alloy of type AlZn5Si2CuPb, the lacquer was an epoxy resin and the particles were composed solely of polytetrafluoroethylene. Otherwise the method used and the parameters used were those described. The lacquer coating was able to withstand 250 hours of running at a speed of 4000 rpm at a full load of 70N/mm$^2$ after which the surface was found to be smooth and completely free from discontinuities.

For comparative purposes, a similar test sample without the lacquer coating with a load of only 60N/mm$^2$ in the same time period, showed cracks and broken pieces. The test results demonstrated surprisingly effective running properties for the lacquer coating 14 at high loads with low wear.

I claim:

1. A method of making a multilayer composite sliding element, comprising the steps of:
   (a) degreasing a sliding surface of a metal sliding layer;
   (b) applying to the degreased surface without roughening thereof a uniform thickness coating of a dispersion of sliding-promoting solids in the form of fine particles in a film-forming polymer solution to a thickness up to 50% greater than a thickness of said solids;
   (c) forming in said coating a multiplicity of flecks in a generally leopard-spot pattern by reducing the thickness of said coating and precrosslinking and drying said coating of said dispersion to form a film having over a major part of said sliding surface a basic thickness of <10 μm having nonuniformly distributed islets of said solids projecting from said film and constituting said flecks, said islets having a greater thickness then said basic thickness and said particles being located in said islets; and
   (d) baking said film into said surface and fixing said islets therein at a temperature between 100° C. and 250° C.

2. The method defined in claim 1 wherein the coating of said dispersion is subjected, immediately after application to said surface, to said precrosslinking by heating.

3. The method defined in claim 1 wherein said dispersion is sprayed onto said surface.

4. The method defined in claim 1 wherein said dispersion is formed by mixing fine particles of polytetrafluoroethylene, fluorinated graphite, molybdenum disulfide or mixtures thereof into an epoxy resin soluble lacquer.

* * * * *